(12) United States Patent
Stephens

(10) Patent No.: US 9,261,099 B2
(45) Date of Patent: Feb. 16, 2016

(54) VACUUM PUMP

(75) Inventor: Philip John Stephens, Worthing (GB)

(73) Assignee: Edwards Limited, West Sussex (GB)

( * ) Notice: Subject to any disclaimer, the term of this patent is extended or adjusted under 35 U.S.C. 154(b) by 862 days.

(21) Appl. No.: 13/505,550

(22) PCT Filed: Oct. 12, 2010

(86) PCT No.: PCT/GB2010/051718
§ 371 (c)(1),
(2), (4) Date: May 2, 2012

(87) PCT Pub. No.: WO2011/058339
PCT Pub. Date: May 19, 2011

(65) Prior Publication Data
US 2012/0219407 A1 Aug. 30, 2012

(30) Foreign Application Priority Data
Nov. 11, 2009 (GB) .................................. 0919684.1

(51) Int. Cl.
*F04D 29/10* (2006.01)
*F04D 19/04* (2006.01)
(Continued)

(52) U.S. Cl.
CPC ................ *F04D 19/04* (2013.01); *F04C 25/02* (2013.01); *F04C 27/009* (2013.01); *F04D 29/102* (2013.01); *F04C 18/12* (2013.01)

(58) Field of Classification Search
CPC ..... F04D 19/04; F04D 19/042; F04D 23/005; F04D 29/102; F04D 29/161; F04D 29/266
See application file for complete search history.

(56) References Cited

U.S. PATENT DOCUMENTS

| 4,645,414 A * | 2/1987 | DeHart et al. .................. 415/83 |
| 2004/0086396 A1 * | 5/2004 | De Smedt ............. F04C 29/045 417/372 |

FOREIGN PATENT DOCUMENTS

| CN | 1477310 A | 2/2004 |
| JP | S55152963 A | 11/1980 |

(Continued)

OTHER PUBLICATIONS

Office Action dated Aug. 12, 2014 for corresponding Japanese Application No. 2012-538405.

(Continued)

*Primary Examiner* — Richard Edgar
*Assistant Examiner* — Brian O Peters
(74) *Attorney, Agent, or Firm* — Westman, Champlin & Koehler, P.A.

(57) ABSTRACT

Vacuum pump for pumping gas from a process chamber, the pump comprising: a rotor supported for rotation in a pumping chamber by a drive shaft, the shaft extending through a shaft bore in a wall of the pumping chamber extending transversely to the drive shaft, and a seal arrangement provided between the shaft and the transverse wall for resisting the passage of gas through the shaft bore, wherein on rotation of the rotor gas is pumped from a low pressure region at an inlet of the pumping chamber to a high pressure region at an outlet of the pumping chamber, and wherein the rotor and the transverse wall are spaced apart by an axial clearance along which back leakage of gas can flow from the high pressure region to the low pressure region, and an additional leakage path for back leakage is formed spaced away from the seal arrangement along which gas can flow without contact with the seal arrangement so that the amount of gas which contacts the seal arrangement during use of the pump is reduced.

11 Claims, 3 Drawing Sheets

(51) Int. Cl.
*F04C 25/02* (2006.01)
*F04C 27/00* (2006.01)
*F04C 18/12* (2006.01)

(56) References Cited

FOREIGN PATENT DOCUMENTS

| | | | |
|---|---|---|---|
| JP | 2004346863 A | 12/2004 | |
| JP | 2006138216 A | 6/2006 | |

OTHER PUBLICATIONS

Response dated Dec. 18, 2012 from corresponding European Application No. EP10771170.7-2315.
U.K. Search Report dated Mar. 9, 2010 from corresponding British Application No. GB0919684.1.
PCT International Search Report dated Dec. 6, 2011 from corresponding PCT Application No. PCT/GB2010/051718.
PCT International Written Opinion dated Dec. 6, 2011 from corresponding PCT Application No. PCT/GB2010/051718.
Second Office Action dated Sep. 4, 2014 and Chinese Search Report dated Jul. 14, 2014 for corresponding Chinese Application No. 20108005166.6.
Third Office Action dated Jan. 22, 2015 for corresponding Chinese Application No. 201080051166.6.
Examination Report dated Mar. 31, 2015 for corresponding British Application No. GB0919684.1.
Office Action dated Apr. 20, 2015 for corresponding Taiwanese Application No. 099135804.

\* cited by examiner

VACUUM PUMP

The present invention relates to vacuum pumps, and in particular to improvements in shaft seal arrangements in vacuum pumps.

Vacuum pumps are widely used in industrial processes to provide a clean and/or low pressure environment for the manufacture of products, which include semiconductor devices, flat panel displays and solar panels. During processes such as chemical vapour deposition or etching, processing gases are supplied to a process chamber. Any unconsumed process gas is subsequently pumped from the process chamber using a vacuum pump. These gases can be corrosive or otherwise harmful to the components of the pump causing corrosion, increased wear or limited working life.

The housing of a vacuum pump provides a stator within which the drive shafts and rotors rotate during use of the pump. The stator comprises a pumping chamber having a gas inlet and a gas outlet and in use, the rotor or rotors rotate to trap gas at the inlet at relatively low pressure, compressing it during rotation and exhausting it at relatively high pressure at the outlet. In some arrangements, the stator may provide a plurality of pumping chambers in series or parallel.

In the case of a single stage pump, the drive shafts extend through shaft bores in a transverse wall which separates a motor and gear assembly from the pumping chamber on one axial side of the pumping chamber. In the case of multi-stage pumps, transverse walls may also extend between pumping chambers. The transverse wall adjacent the motor and gear assembly is typically referred to as a head plate. A shaft seal arrangement is provided for sealing the shaft bore between the shaft and the transverse wall for preventing or resisting the passage of gases from the pumping chamber. Pumps of this type may be roots or claw pumps.

FIG. 1 illustrates the current configuration of a shaft seal arrangement 10 in for example a roots pump. The shaft 2 of a vacuum pump passes through a shaft bore in head plate 6. A rotor 4 is supported for rotation by the shaft 2 in a pumping chamber behind the head plate 6. A narrow axial clearance exists between the rear face of the rotor 4 and the front face of the head plate 6. It is preferable to make the axial clearance as small as possible to reduce leakage from a high pressure region 3 to a low pressure region 1, although in practice, the reduction in size of the axial clearance is limited by manufacturing tolerances and to allow thermal expansion of the rotor and head plate during use. A seal arrangement is provided in the shaft bore and comprises a lip 16 which extends from the head plate and is adapted due to internal bias to press against the shaft to seal the gap between the shaft 2 and head plate 6.

As the rotor 4 rotates it draws fluid from a low pressure area 1 at the inlet to a high pressure area 3 at the outlet, or exhaust. Even though the axial clearance between the rotor and head plate is small, gas will leak from the high pressure side to the low pressure side. In this regard, gas leaking through the axial clearance as shown by arrow 5 enters the shaft bore. Some of the gas will pass around the shaft (as shown by the curved arrow) and continue through the axial clearance as shown by arrow 7. Other gas entering the shaft bore may come into contact with the seal lip 16 prior to leaving the shaft bore. If the gas is corrosive it will corrode the seal lip 16. The introduction of a seal purge 9 which passes between the lip 16 and the shaft provides some dilution of the process gas but the dilution effect is minimal. In FIG. 1 arrow 5 represents back leakage of the process gas whilst arrow 7 represents mixed back leakage and seal purge flow.

Tests have shown that when pumping air through a known vacuum pumping system the concentration of oxygen at the seal lip is barely affected by a typical nitrogen purge. Even increasing the purge flow beyond that which would normally be encountered only halves the O2 concentration measured in the space between the head plate and shaft. If this result were applied to corrosive process gases such as fluorine it would be concluded that increasing the nitrogen purge would extend the seal life by reducing the concentration of fluorine. However it would not eliminate seal lip corrosion by significant levels. Therefore it can also be extrapolated that to reduce the unwanted, corrosive gas level would require significantly large volumes of purge gas. This increases the running cost of the pump.

Accordingly, the seal arrangement suffers from chemical corrosion when pumping corrosive gases and must be periodically replaced, causing pump down time and adding to the cost of ownership.

It is desirable to increase the effectiveness of the nitrogen shaft seal purge system and thus provide better seal lip protection without requiring a significant increase in nitrogen shaft seal purge flow rates.

According to the present invention there is provided a vacuum pump for pumping gas from a process chamber, the pump comprising: a rotor supported for rotation in a pumping chamber by a drive shaft, the shaft extending through a shaft bore in a wall of the pumping chamber extending transversely to the drive shaft, and a seal arrangement provided between the shaft and the transverse wall for resisting the passage of gas through the shaft bore, wherein on rotation of the rotor gas is pumped from a low pressure region at an inlet of the pumping chamber to a high pressure region at an outlet of the pumping chamber, and wherein the rotor and the transverse wall are spaced apart by an axial clearance along which back leakage of gas can flow from the high pressure region to the low pressure region, and an additional leakage path for back leakage is formed spaced away from the seal arrangement along which gas can flow without contact with the seal arrangement so that the amount of gas which contacts the seal arrangement during use of the pump is reduced.

By providing a leakage path from the high pressure side of the pumping chamber to the low pressure side of the pumping chamber the life of the seal may be prolonged without the need for a large increase in nitrogen flow. Neither are additional parts required. Increased product life with minimal cost of ownership or increase in cost of manufacture offers a significant advantage.

A further advantage is that the invention can be retrofitted to many existing pumps.

In order that the invention may be more clearly understood, reference will now be made to the accompanying drawings, given by way of example only, in which.

Figure 1:
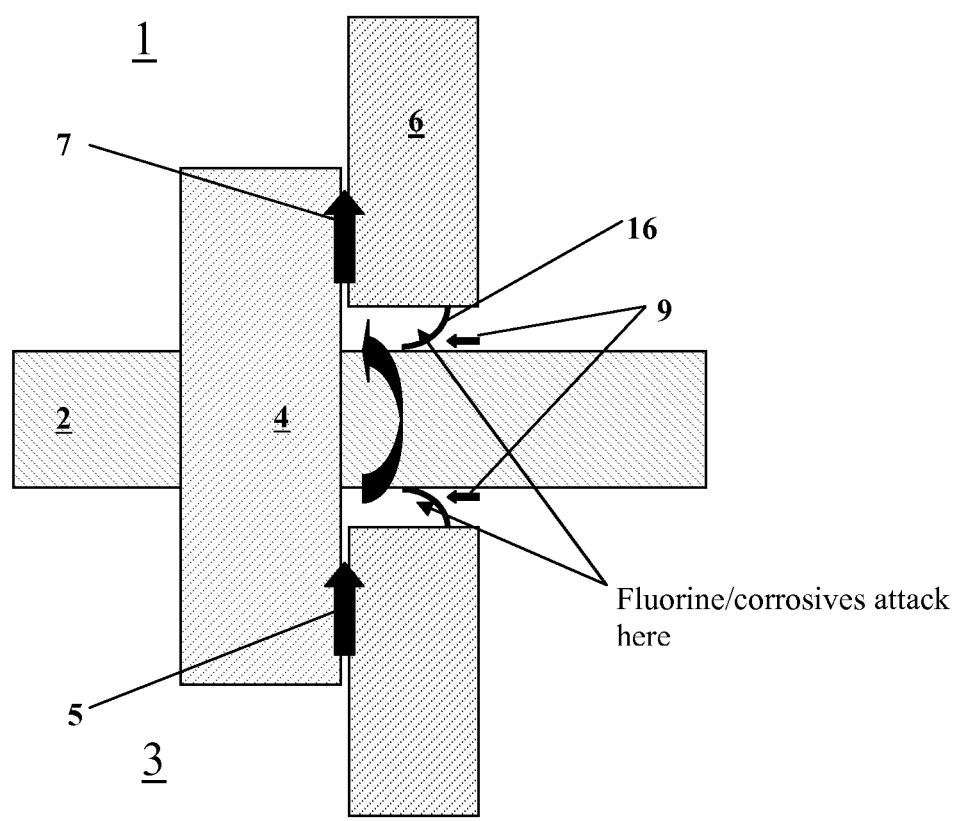
FIG. 1 is a schematic illustration of the current configuration of the shaft seal arrangement.
Figure 2:
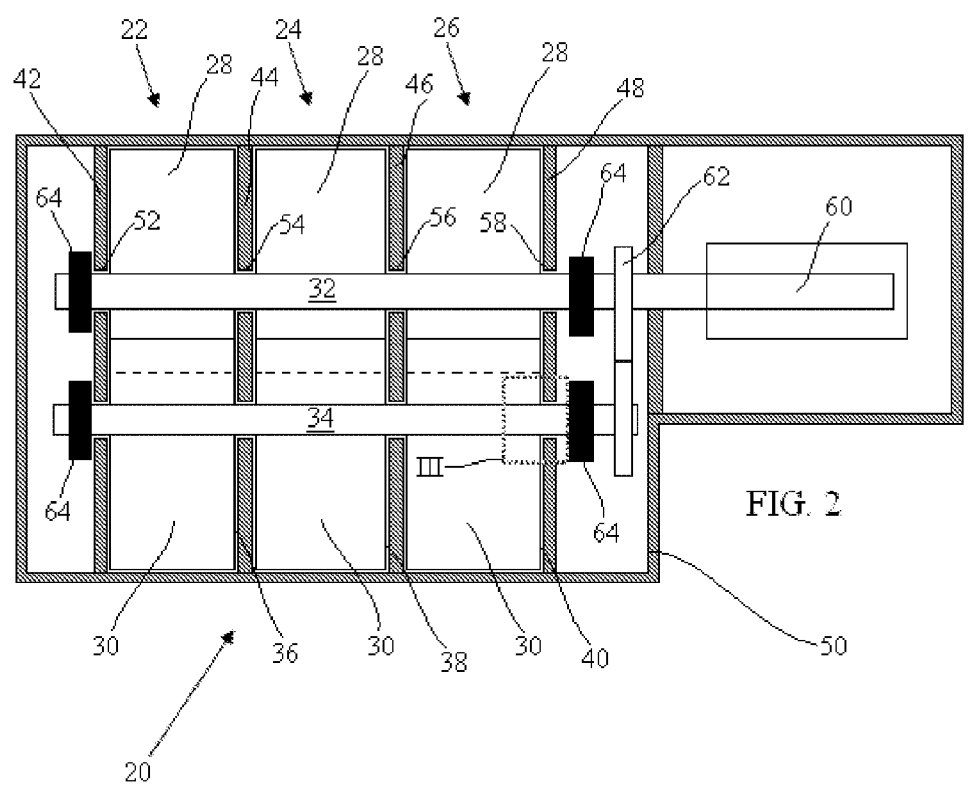
FIG. 2 is a schematic illustration of a vacuum pump.

Referring to FIG. 2, a vacuum pump 20 is shown for pumping gas from a process chamber (not shown). The pump 20 is configured for pumping corrosive gases which corrode a seal arrangement in the pump on prolonged contact. The pump can also pump gases which although may not corrode the seal lip nevertheless cause damage to it, limiting the seal arrangements useful life.

In this example, the pump is a roots pump which comprises a plurality of pumping stages 22, 24, 26. The pump 20 comprises two rotors 28, 30 for each pumping stage supported by respective drive shaft 32, 34 for rotation in pumping chamber 36, 38, 40. The pumping chambers are defined by walls 42, 44, 46, 48 and the outer housing 50 of the pump. The shafts extend through shaft bores 52, 54, 56, 58 in each of the transverse walls of the pumping chambers. The transverse walls 42, 48 are head plates. Head plate 48 is at the highest pressure stage 26 and separates the motor 60 and gear assembly 62 from the pumping chamber 40. Bearings 64 support the shafts for rotation. Although FIG. 2 shows a pump with a plurality of pumping stages the present invention is applicable to a single stage pump.

Figure 3:
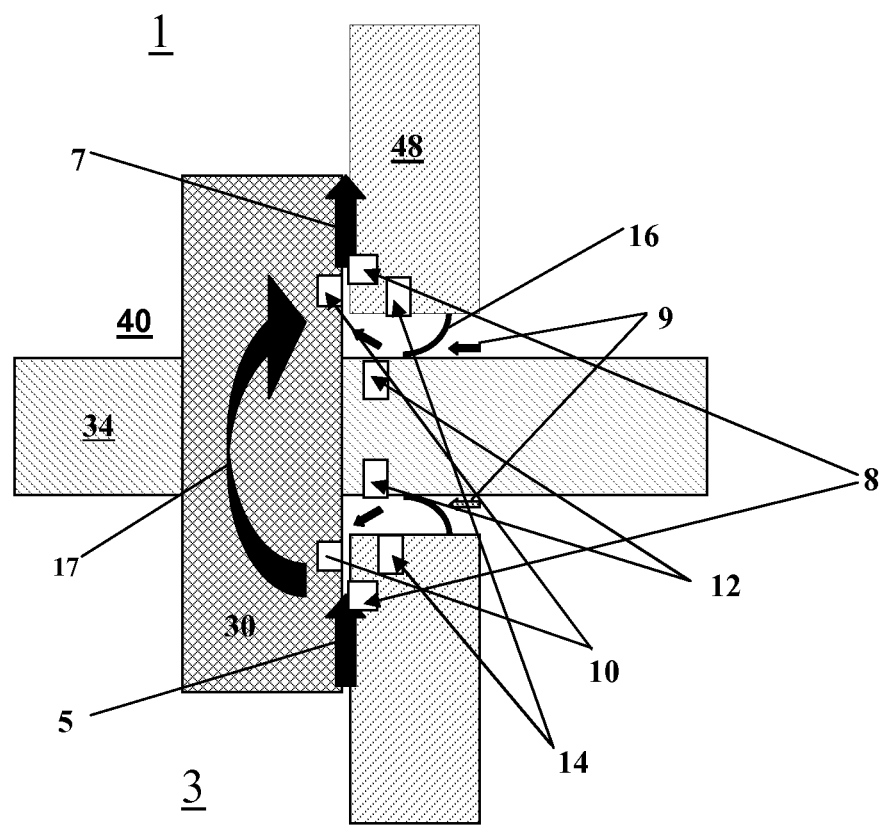
FIG. 3 is a schematic illustration of a configuration of an improved shaft seal arrangement.

FIG. 3 shows an enlarged schematic view of the area III shown in FIG. 2. It will be appreciated that the present invention is equally applicable to the arrangement of the traverse wall and shaft 32. As shown in FIG. 3, a seal arrangement 16 is provided between the shaft 34 and the transverse wall 48 for resisting the passage of gas through the shaft bore, to the right as shown in FIG. 3. On rotation of the rotor 30, gas is pumped from a low pressure region 1 at an inlet of the pumping chamber 40 to a high pressure region 3 at an outlet of the pumping chamber.

The rotor 30 and the transverse wall 48 are spaced apart by an axial clearance along which back leakage of gas can flow from the high pressure region 3 to the low pressure region 1. One or more leakage paths 8, 10, 12, 14 are formed along which gas can flow without contact with the seal arrangement so that the amount of gas which contacts the seal arrangement during use of the pump is reduced.

As shown in FIG. 3 the seal arrangement comprises a resilient seal lip 16 which extends from the transverse wall 48 and presses against shaft 34 due to its internal bias.

It will be appreciated that the leakage paths are spaced away from the seal lip so that when gas flows in a direction of the seal lip, at least some of the gas is urged along a different route so that it does not contact and cause corrosion of the seal lip. In this way, the amount of gas which comes into contact with the seal lip is reduced.

Preferably, the leakage path provides a preferential flow path to a flow path of gas which contacts the seal arrangement. That is, where gas would in the absence of one or more of the leakage paths normally flow into contact with the seal arrangement, the presence of a leakage path gives that gas a preferred route away from the seal arrangement.

A leakage path may be formed in one or more of an axial end face of the rotor, an axial end face of the transverse wall, the shaft bore, or the shaft. The leakage path may comprise a groove, which may be annular as shown, or may comprise a bore through one of the components.

For example, during back leakage, gas initially flows along the axial clearance as indicated by arrow 5. When the gas reaches the annular groove 10 in the axial end face of the rotor, less resistance to flow is provided by the annular groove 10 than along the relatively narrow axial clearance. Further, a larger pressure differential may exist between high pressure portions of the annular groove and low pressure portions of the groove than between the pressure along the axial groove and the pressure in the shaft bore. It will be noted in this regard, and as explained in more detail below, that purge gas is injected into the shaft bore which increases shaft bore pressure. Accordingly, more gas flows through annular groove 10 (as shown by arrow 17) than flow into the shaft bore. Annular groove 8 in the axial end face of head plate 48 provides a similar function.

When the leakage path is formed in one or both of an axial end face of the rotor or an axial end face of the transverse wall, the leakage path bypasses the shaft bore. In this way, the leakage path reduces the amount of process gas which enters the shaft bore and therefore further reduces the possibility of contact with the seal arrangement.

By way of further example, as indicated above, gas initially flows along the axial clearance as indicated by arrow 5. When the gas reaches the annular groove 12 in the outer surface of the shaft, less resistance to flow is provided by the annular groove 10 than to continue along the relatively narrow radial clearance between the shaft and the head plate. In this regard it will be noted that the radial clearance is exaggerated in the drawings and is typically less than 1 mm. It will also be noted that a larger pressure differential may exist between high pressure portions of the annular groove 12 and low pressure portions of the groove than between the pressure along different portions of the shaft bore. It will also be noted in this regard, and as explained in more detail below, that purge gas is injected into the shaft bore and the pressure in the shaft bore is greatest proximate the seal lip. Accordingly, more gas flows through annular groove 12 than flows towards the seal lip. Annular groove 14 in the inner surface of head plate 48 provides a similar function.

The annular groove in the drive shaft may be formed in the drive shaft itself or in a collar located around and fixed to the drive shaft. The annular groove in the rotor may be formed in the rotor itself or in a plate located around the shaft and fixed relative to the rotor.

The introduction of a leakage path around the shaft bore, (such as an annular groove in the face of the head plate) gives the back-leakage a less restrictive path which it will follow preferentially over a path to the seal arrangement. The new, or additional, leakage path could take the form at least one, or a combination of, the following: one or more grooves 8 in the vertical face of the head plate 48: one or more grooves 10 in the face of the rotor 30; one or more grooves 12 in the shaft 32; one or more grooves 14 in the shaft bore. However it should be understood that the invention does not require more than one leakage path. The paths illustrated in FIG. 2 are not all necessary for the performance of the invention. They are illustrated in one figure for convenience only.

The main function of the added leakage path is to create a leak path of equivalent, or reduced, resistance to gas flow compared to the existing leak path between the rear face of the rotor 30 and front face of the head plate 48.

The pump includes means to deliver a purge gas 9, for example nitrogen, through the shaft bore and across the seal arrangement for reducing the contact of process gas with the seal arrangement.

It has been found that a combination of purge and multiple leakage paths is advantageous. An experiment was conducted to test the concentration of oxygen in the shaft seal location by passing 100 slm air through the pump. This should equate to the relative concentration of fluorine that would be present if used. Two shaft seal purge rates were used for each configuration: normal purge flows, and an increased purge flow. Three configurations were tested: a) no leakage path; b) a leakage path formed on the shaft (on a ring seal attached to the shaft); and c) two leakage paths in combination—one on the rotor shaft and one on the rear face of the rotor. The results are shown in Table 1.

TABLE 1

| Leak path configuration | Reduction in partial pressure at seal face resulting leak path and increase of seal purge flow from <10 slm to >40 slm N2 |
|---|---|
| No leak path | 50% |
| Leak path round shaft | 75% |

TABLE 1-continued

| Leak path configuration | Reduction in partial pressure at seal face resulting leak path and increase of seal purge flow from <10 slm to >40 slm N2 |
|---|---|
| Leak paths round shaft and rear of rotor face. | 99% |

As can be seen, when used in conjunction with an increase in seal purge gas flow, the use of one leakage path round the shaft reduced the partial pressure of oxygen at the seal by 75%. The use of two leakage paths reduced the partial pressure of oxygen at the seal by 99%.

The invention deliberately introduces a leak path around the shaft bores to divert back leakage around the seal face rather than let it flow across the seal face. The invention can be retrofitted to many existing pumps.

It should be understood by those skilled in the art that the invention is applicable to any positive displacement pump.

The invention has been described above with respect to a preferred embodiment. It will be understood by those skilled in the art that changes and modifications may be made thereto without departing from the scope of the invention as set out in the appended claims.

The invention claimed is:

1. A vacuum pump for pumping gas from a process chamber, the pump comprising:
   a rotor supported for rotation in a pumping chamber by a drive shaft, the shaft extending through a shaft bore in a wall of the pumping chamber extending transversely to the drive shaft, and
   a seal arrangement extending from the transverse wall to the shaft for resisting the passage of gas through the shaft bore,
   wherein on rotation of the rotor, gas is pumped from a low pressure region at an inlet of the pumping chamber to a high pressure region at an outlet of the pumping chamber, and
   wherein the rotor and the transverse wall are spaced apart by an axial clearance along which back leakage of gas can flow from the high pressure region to the low pressure region, and an additional leakage path for back leakage is formed spaced away from the seal arrangement along which the back leakage of gas can flow without contact with the seal arrangement so that the amount of gas which contacts the seal arrangement during use of the pump is reduced.

2. The pump as claimed in claim 1, wherein the leakage path provides a preferential flow path to a flow path of gas which contacts the seal arrangement.

3. The pump as claimed in claim 1, wherein the leakage path is formed in one or more of an axial end face of the rotor, an axial end face of the transverse wall, the shaft bore, or the shaft.

4. The pump as claimed in claim 1, wherein the leakage path is formed in one or both of an axial end face of the rotor or an axial end face of the transverse wall and bypasses the shaft bore.

5. The pump as claimed in claim 1, wherein the leakage path takes the form of at least one groove.

6. A pump as claimed in claim 1, including means to deliver a purge gas through the shaft bore and across the seal arrangement for reducing the contact of process gas with the seal arrangement.

7. The pump as claimed in claim 6, wherein the purge gas is nitrogen.

8. A vacuum pump rotor for use in a vacuum pump as claimed in claim 1, the rotor comprising a rotor bore for receiving a drive shaft of the motor so that the rotor can be driven by the drive shaft, the rotor comprising an annular groove around the rotor bore for directing back leakage of process gas around a shaft bore of the pump in which a seal arrangement is located for reducing contact of the process gas with the seal arrangement.

9. A vacuum pump shaft for use in a vacuum pump as claimed in claim 1, the shaft comprising an annular groove extending around its circumference such that when the shaft extends through shaft bore in a transverse wall of a pump on one axial side of a pumping chamber the annular groove is located in the shaft bore so that in use the annular groove forms a leakage path for process gas from a high pressure region to a low pressure region of the pumping chamber which directs gas away from a seal arrangement located in the shaft bore for sealing between the transverse wall and the shaft.

10. A transverse wall for use in a vacuum pump as claimed in claim 1, the transverse wall being located in a pump on one axial side of a pumping chamber and comprising a shaft bore through which a drive shaft can extend and an annular groove for forming a leakage path for process gas from a high pressure region to a low pressure region of the pumping chamber which directs gas away from a seal arrangement located in the shaft bore for sealing between the shaft and the transverse wall.

11. A transverse wall as claimed in claim 10, wherein the annular groove is formed on an axial side face of thereof, and process gas passing along the annular groove by passes the shaft bore.

* * * * *